United States Patent
Ishii et al.

(10) Patent No.: US 7,535,932 B2
(45) Date of Patent: May 19, 2009

(54) RADIO COMMUNICATIONS SYSTEM, RADIO NETWORK CONTROLLER AND BASE STATION

(75) Inventors: Minami Ishii, Yokohama (JP); Sung Uk Moon, Yokosuka (JP); Takehiro Nakamura, Yokosuka (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 654 days.

(21) Appl. No.: 11/019,350

(22) Filed: Dec. 23, 2004

(65) Prior Publication Data

US 2005/0157658 A1 Jul. 21, 2005

(30) Foreign Application Priority Data

Dec. 26, 2003 (JP) ............................. 2003-435314

(51) Int. Cl.
*H04W 4/00* (2006.01)
*H04J 3/06* (2006.01)
*H04J 3/07* (2006.01)
*H04W 72/00* (2006.01)

(52) U.S. Cl. ...................... 370/509; 370/329; 370/350; 455/464; 455/502

(58) Field of Classification Search ................. 370/238, 370/328, 329, 324, 336, 347, 350, 431, 503, 370/508, 516, 517, 519
See application file for complete search history.

(56) References Cited

U.S. PATENT DOCUMENTS

| | | | | |
|---|---|---|---|---|
| 5,828,659 | A * | 10/1998 | Teder et al. ................. | 370/328 |
| 6,810,019 | B2 * | 10/2004 | Steudle ....................... | 370/252 |
| 6,816,472 | B1 * | 11/2004 | Dillon et al. ................ | 370/331 |
| 6,947,756 | B2 * | 9/2005 | Khan et al. ............. | 455/456.5 |
| 6,954,483 | B2 * | 10/2005 | Doetsch et al. ............. | 375/136 |
| 6,980,615 | B2 * | 12/2005 | Dick et al. .................. | 375/356 |
| 7,031,701 | B1 * | 4/2006 | Ahmavaara et al. ......... | 455/423 |

(Continued)

FOREIGN PATENT DOCUMENTS

CN     1260921 A     7/2000

(Continued)

OTHER PUBLICATIONS

"3rd Generation Partnership Project; Technical Specification Group Radio Access Network; Physical channels and mapping of transport channels onto physical channels (FDD) (Release 5)", 3GPP TS 25.211, V5.5.0, (Sep. 2003), pp. 1-51.

(Continued)

*Primary Examiner*—Hanh Nguyen
(74) *Attorney, Agent, or Firm*—Oblon, Spivak, McClelland, Maier & Neustadt, P.C.

(57) ABSTRACT

The present invention relates to a radio communications system which transmits same downlink information to a plurality of cells by using downlink common channels. The radio communications system includes a radio network controller and a base station. The radio communications system is configured to measure delays between the time when the radio network controller transmits the downlink information and the time when the base station transmits the downlink information to each of the plurality of cells; and to control timing for transmitting the downlink information to each of the plurality of cells by the base station in accordance with measured delays.

7 Claims, 9 Drawing Sheets

U.S. PATENT DOCUMENTS

| | | | |
|---|---|---|---|
| 7,136,666 B2 * | 11/2006 | Charriere et al. | 455/522 |
| 7,209,463 B2 * | 4/2007 | Park et al. | 370/335 |
| 2002/0080719 A1 * | 6/2002 | Parkvall et al. | 370/235 |
| 2003/0021288 A1 * | 1/2003 | Hayashi et al. | 370/461 |
| 2003/0117975 A1 * | 6/2003 | Yanai | 370/331 |
| 2003/0152031 A1 * | 8/2003 | Toskala et al. | 370/236 |
| 2004/0100918 A1 * | 5/2004 | Toskala et al. | 370/314 |
| 2007/0041342 A1 * | 2/2007 | Usuda et al. | 370/329 |

FOREIGN PATENT DOCUMENTS

WO     WO 98/57450     12/1998

OTHER PUBLICATIONS

3$^{rd}$ Generation Partnership Project; Technical Specification Group Radio Access Network; Synchronisation in UTRAN Stage 2 (Release 5), 3GPP TS 25.402, V 5.2.0 (Jun. 2003), pp. 1-47.

* cited by examiner

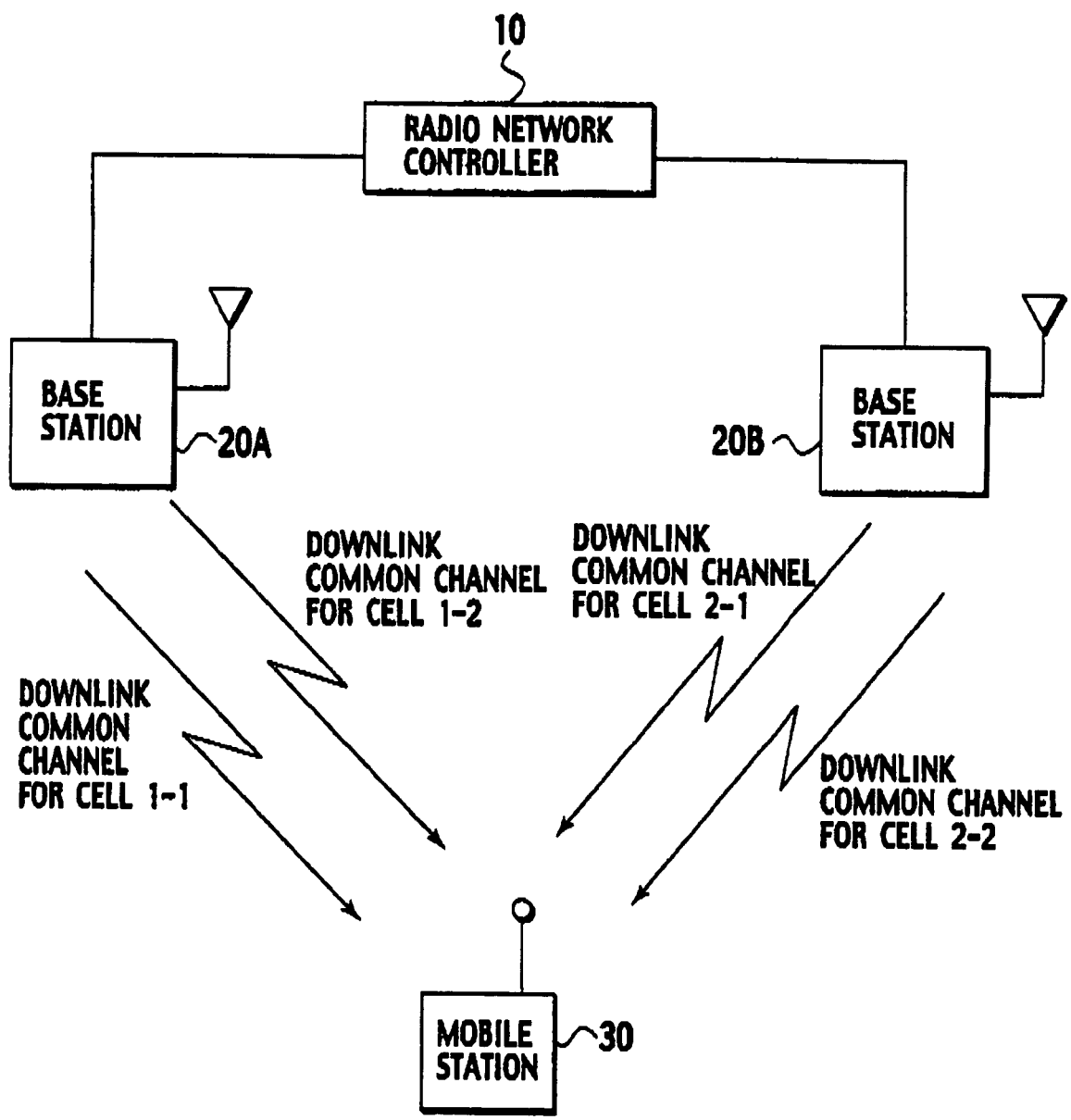

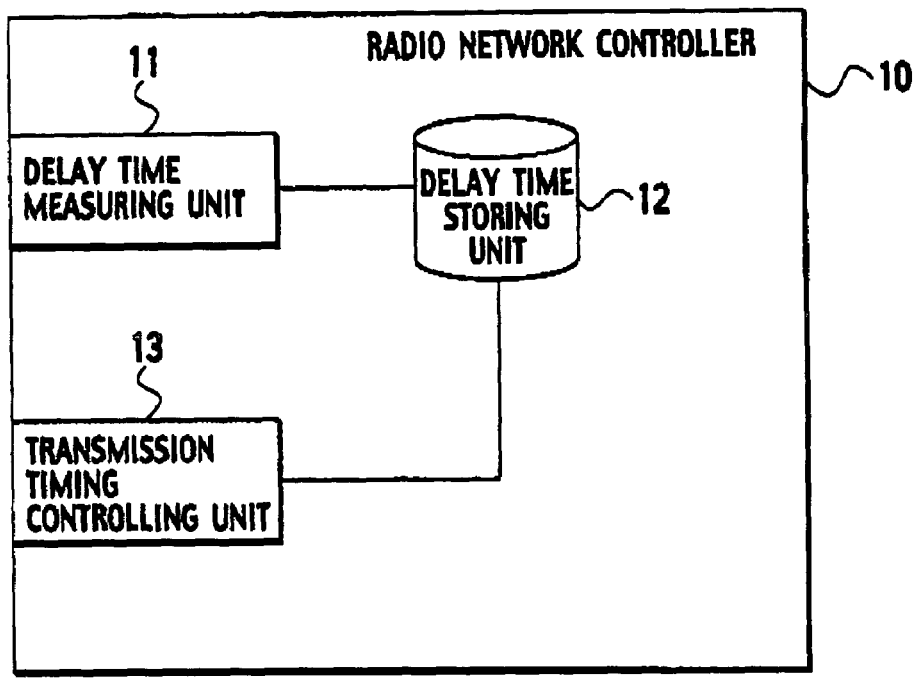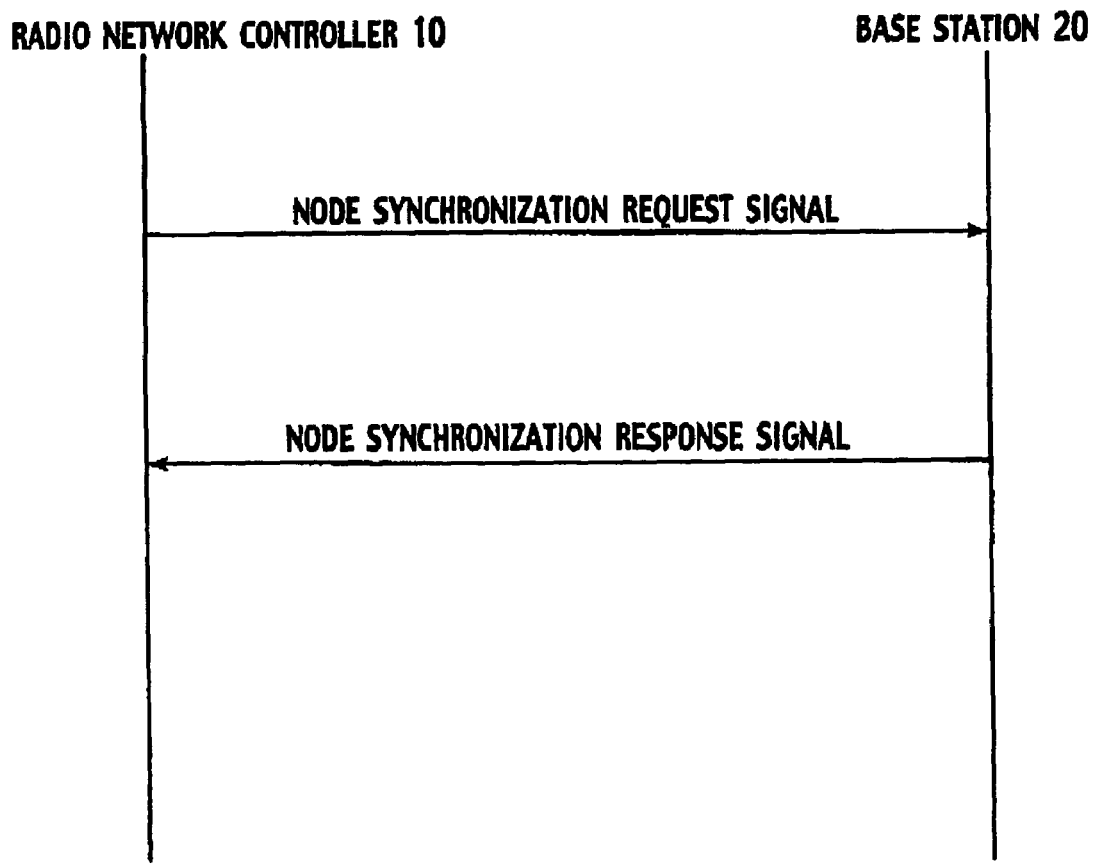

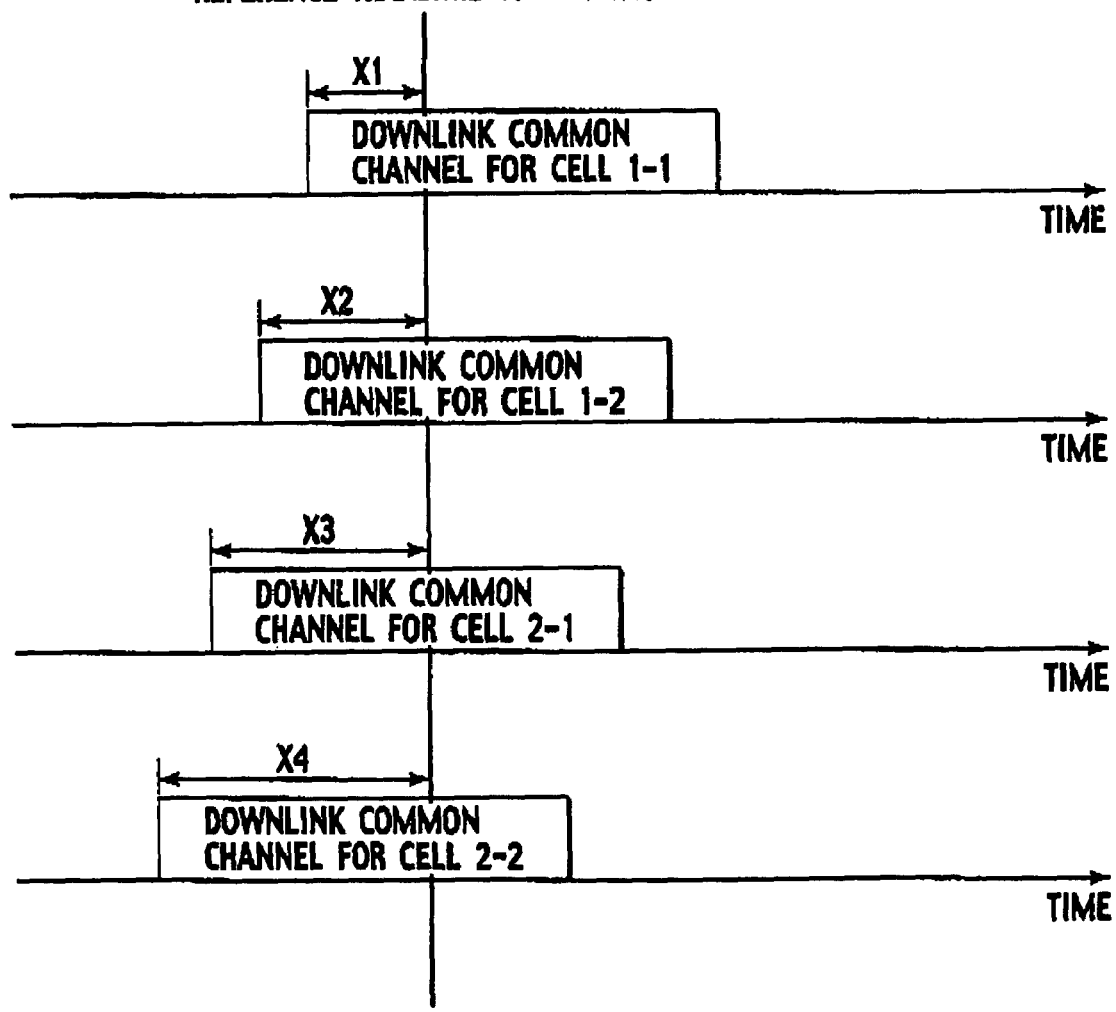

RADIO COMMUNICATIONS SYSTEM, RADIO NETWORK CONTROLLER AND BASE STATION

CROSS REFERENCE TO RELATED APPLICATION

This application is based upon and claims the benefit of priority from the prior Japanese Patent Application No. P2003-435314, filed on Dec. 26, 2003; the entire contents of which are incorporated herein by reference.

BACKGROUND OF THE INVENTION

1. Field of the Invention

The present invention relates to a radio communications system which transmits same downlink information to a plurality of cells by using downlink common channels, a radio network controller and a base station.

2. Description of the Related Art

In a conventional radio communications system using the W-CDMA (Wideband-Code Division Multiple Access) method, upon receiving downlink information transmitted over a downlink common channel, a mobile station is configured to detect a cell having the smallest path loss in a received pilot channel from among a plurality of cells as a cell to which the mobile station should establish a radio link, and to receive the downlink common channel (the downlink information) only from the detected cell.

In other words, in the conventional radio communications system using the W-CDMA method, unlike a dedicated channel which enables soft handover processing, the mobile station is not configured to receive the downlink common channel (the downlink information) from a plurality of cells.

However, as described above, the mobile station can only receive a downlink common channel transmitted from one cell, in the conventional radio communications system.

Therefore, there is a problem in that transmission power of the downlink common channel is required to be increased in order to make reception qualities in the neighborhood of cell borders high, so that the downlink communication capacity is deteriorated.

BRIEF SUMMARY OF THE INVENTION

In viewing of the foregoing, it is an object of the present invention to provide a radio communications system which controls transmission timing of downlink common channels among a plurality of cells so that a mobile station receives and combines the downlink common channels from the plurality of cells, a radio network controller and a base station.

A first aspect of the present invention is summarized as a radio communications system which transmits same downlink information to a plurality of cells by using downlink common channels. The radio communications system includes a radio network controller and a base station. The radio communications system is configured to measure each delay time between the time when the radio network controller transmits the downlink information and the time when the base station transmits the downlink information to each of the plurality of cells; and to control timing for transmitting the downlink information to each of the plurality of cells by the base station, in accordance with each of measured delay times.

A second aspect of the present invention is summarized as a radio network controller used in a radio communications system in which a base station transmits same downlink information to a plurality of cells by using downlink common channels. The radio network controller includes a measurer configured to measure each delay time between the time when the radio network controller transmits the downlink information and the time when the base station transmits the downlink information to each of the plurality of cells; and a controller configured to control timing for transmitting the downlink information to each of the plurality of cells by the base station, in accordance with each of measured delay times.

In the second aspect, the measurer can be configured to measure the delay time in accordance with timing difference information acquired when node synchronization is established between the radio network controller and the base station.

In the second aspect, the measurer can be configured to measure the delay time in accordance with timing difference information acquired when synchronization of a common channel is established between the radio network controller and the base station.

In the second aspect, the measurer can be configured to measure the delay times in accordance with the sum of each cell unique timing offset and each cell common channel timing offset, the cell unique timing offset being a difference between transmission timing of a base station common frame which is common in the base station and transmission timing of a cell unique frame which is unique to each of the plurality of cells, the cell common channel timing offset being a difference between the transmission timing of the cell unique frame and transmission timing of a cell common channel frame which is common in the plurality of cells.

In the second aspect, the controller can be configured to transmit the downlink information to the base station at timing earlier than a reference transmission timing by each of measured delay times; and to instruct the base station to transmit the downlink information to each of the plurality of cells without waiting each of the measured delay times.

In the second aspect, the measurer can be configured to measure each delay time difference which is a difference between each of measured delay times and each of maximum permissible delay times in the plurality of cells; and the controller can be configured to instruct the base station to delay transmission of the downlink information to each of the plurality of cells by each of the delay time differences.

A third aspect of the present invention is summarized as a base station which transmits same downlink information to a plurality of cells by using downlink common channels. The base station includes an acquirer configured to acquire each delay time difference between each of delay times and each of maximum permissible delay times in the plurality of cells, the delay time being a difference between the time when a radio network controller transmits the downlink information and the time when the base station transmits the downlink information to each of the plurality of cells; and a transmitter configured to delay transmission of the downlink information transmitted from the radio network controller to each of the plurality of cells by each of acquired delay time differences.

A fourth aspect of the present invention is summarized as a base station which transmits same downlink information to a plurality of cells by using downlink common channels. The base station includes a transmitter configured to transmit the downlink information transmitted from a radio network controller to each of the plurality of cells, in accordance with transmission timing instructed by the radio network controller for each of the plurality of cells.

BRIEF DESCRIPTION OF SEVERAL VIEWS OF THE DRAWINGS

FIG. 1 is a diagram showing an entire configuration of a radio communications system according to embodiments of the present invention;

FIG. 2 is a functional block diagram of a radio network controller according to a first embodiment of the present invention;

FIG. 3 is a diagram for explaining a method for measuring a delay time by a delay time measuring unit of the radio network controller according to the first embodiment of the present invention;

FIG. 4 is a diagram showing an example of contents stored in a delay time storing unit of the radio network controller according to the first embodiment of the present invention;

FIG. 5 is a diagram for explaining a method for transmitting a downlink common channel to a plurality of cells in a radio communications system according to the first embodiment of the present invention;

DETAILED DESCRIPTION OF THEE INVENTION

Figures 6, 7:
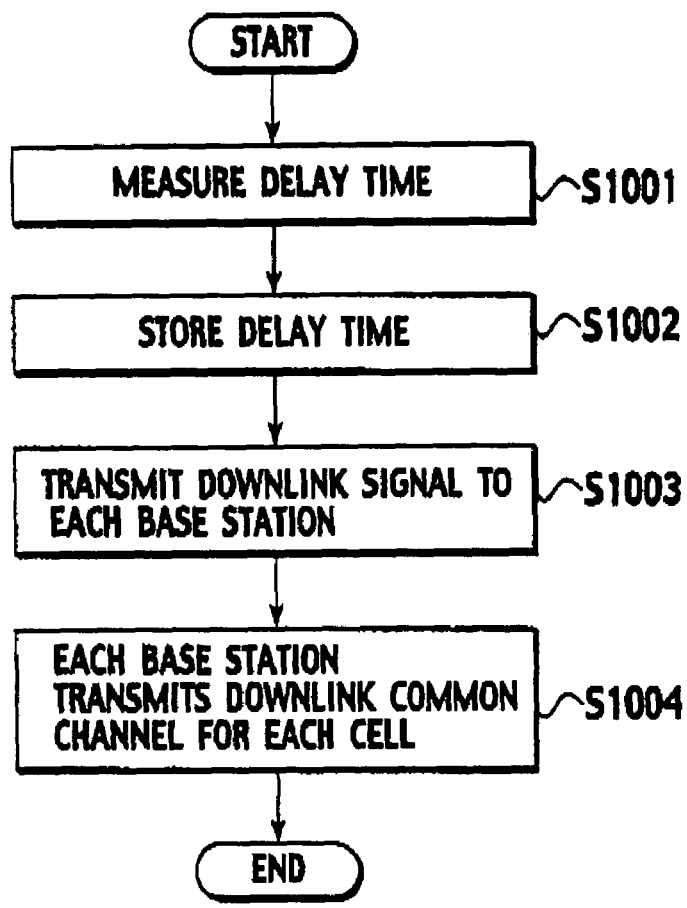
FIG. 6 is a flowchart showing an operation of the radio communications system according to the first embodiment of the present invention.
FIG. 7 is a diagram showing an example of contents stored in a delay time storing unit of a radio network controller according to a second embodiment of the present invention.

<A Configuration of a Radio Communications System According to a First Embodiment of the Present Invention>

Referring to FIGS. 1 to 5, a configuration of a radio communications system according to a first embodiment of the present invention will be described. FIG. 1 is a diagram showing an entire configuration of the radio communications system according to the first embodiment.

As shown in FIG. 1, the radio communications system according to the embodiment includes two base stations 20A and 20B under the control of a radio network controller 10.

The base station 20A is configured to manage two cells 1-1 and 1-2, the base station 203 is configured to manage two cells 2-1 and 2-2. the "cell" which is used in the embodiment means both a cell which had been used conventionally and a sector which had been used conventionally.

In the radio communications system according to the embodiment, the base stations are configured to transmit same downlink information to a plurality of cells by using downlink common channels.

To be more specific, the base station 20A is configured to transmit the same downlink information to the cell 1-1 and the cell 1-2, by using a downlink common channel for the cell 1-1 and a downlink common channel for the cell 1-2, respectively.

The base station 20B is configured to transmit downlink information same as the downlink information transmitted from the base station 20A to the cell 2-1 and the cell 2-2, by using a downlink common channel for the cell 2-1 and a downlink common channel for the cell 2-2, respectively.

The mobile station 30 is configured to receive the same downlink information transmitted in the cell 1-1, the cell 1-2, the cell 2-1 and the cell 2-2 over the downlink common channel for the cell 1-1, the downlink common channel for the cell 1-2, the downlink common channel for the cell 2-1 and the downlink common channel for the cell 2-2, respectively, so as to perform a soft combining process or a selective combining process.

The radio network controller 10 can be configured to transmit the downlink information to the plurality of cells 1-1 to 2-2 without regard to the base stations 20A and 20B.

The radio network controller 10 can be configured to transmit the downlink information to each of the base stations 20A and 20B via each link which is established between the radio network controller 10 and each of the base stations 20A and 20B.

Each of the base stations 20A and 20B is configured to transmit the received downlink information to each cell which is contained in each of the base stations 20A and 20B, by using the downlink common channel for each cell.

As shown in FIG. 2, the radio network controller 10 includes a delay time measuring unit 11, a delay time storing unit 12 and a transmission timing controlling unit 13.

The delay time measuring unit 11 is configured to measure each delay time between the time when the radio network controller 10 transmits the downlink information and the time when the base station 20A (or 20B) transmits the downlink information to each of the plurality of cells 1-1 and 1-2 (or 2-1 and 2-2).

The delay time measuring unit 11 can be configured to measure the above mentioned delay time, in accordance with timing difference information acquired when node synchronization is established between the radio network controller 10 and the base station 20A (or 20B).

To be more specific, as shown in FIG. 3, when node synchronization is established between the radio network controller 10 and the base station 20A (or 20B), the radio network controller 10 transmits a node synchronization request signal to the base station 20A (or 20B) and the base station 20A (or 20B) transmits a node synchronization response signal to the radio network controller 10 in response to the node synchronization request signal.

The delay time measuring unit 11 is configured to acquire the above mentioned timing difference information (for example, the following "RFN_BFN timing offset") from the received node synchronization response signal.

The delay time storing unit 12 is configured to store the above mentioned delay time per cell. For example, as shown in FIG. 4, the delay time storing unit 12 is configured to store a "base station", a "cell" and a "delay time" in association with each other.

In an example of FIG. 4, the delay time between the time when the radio network controller 10 transmits the downlink information and the time when the base station 20A transmits the downlink information to the cell 1-1 is "X1".

The delay time between the time when the radio network controller 10 transmits the downlink information and the time when the base station 20A transmits the downlink information to the cell 1-2 is "X2".

The delay time between the time when the radio network controller 10 transmits the downlink information and the time when the base station 20B transmits the downlink information to the cell 2-1 is "X3".

The delay time between the time when the radio network controller 10 transmits the downlink information and the time when the base station 20B transmits the downlink information to the cell 2-2 is "X4".

The transmission timing controlling unit 13 is configured to control timing for transmitting the downlink information to each of the plurality of cells 1-1 and 1-2 (or 2-1 and 2-2) by the base station 20A (or 20B), in accordance with each of delay times stored in the delay time storing unit 12.

To be more specific, as shown in FIG. 5, the transmission timing controlling unit 13 is configured to transmit the downlink information to the base stations 20A and 20B at timing earlier than a reference transmission timing by each of the delay times, and to instruct the base stations 20A and 20B to transmit the downlink information to each of the plurality of cells 1-1 to 2-2 without waiting the each of delay times.

In an example of FIG. 5, the transmission timing controlling unit 13 is configured to transmit the downlink information to the base station 20A at timing earlier than a reference transmission timing by the delay time X1, and to instruct the base station 20A to transmit the downlink information to the cell 1-1 without waiting the delay time X1 (i.e. immediately).

The transmission timing controlling unit 13 is configured to transmit the downlink information to the base station 20A at timing earlier than a reference transmission timing by the delay time X2, and to instruct the base station 20A to transmit the downlink information to the cell 1-2 without waiting the delay time X2 (i.e. immediately).

The transmission timing controlling unit 13 is configured to transmit the downlink information to the base station 20B at timing earlier than a reference transmission timing by the delay time X3, and to instruct the base station 20B to transmit the downlink information to the cell 2-1 without waiting the delay time X3 (i.e. immediately).

The transmission timing controlling unit 13 is configured to transmit the downlink information to the base station 20B at timing earlier than a reference transmission timing by the delay time X4, and to instruct the base station 20B to transmit the downlink information to the cell 2-2 without waiting the delay time X4 (i.e. immediately).

<An Operation of the Radio Communications System According to the First Embodiment>

Referring to FIG. 6, an operation of the radio communications system according to the first embodiment will be described.

As shown in FIG. 6, in step S1001, the delay time measuring unit 11 of the radio network controller 10 measures each delay time between the time when the radio network controller 10 transmits the downlink information and the time when each of the base stations 20A and 20B transmits the downlink information to each of the plurality of cells 1-1 to 2-2.

In step S1002, the delay time storing unit 12 of the radio network controller 10 stores the delay times measured by the delay time measuring unit 11 of the radio network controller 10.

In step S1003, the transmission timing controlling unit 13 of the radio network controller 10 transmits the downlink information to the base stations 20A and 20B at timing earlier than a reference transmission timing by each of the delay times, and to instruct the base stations 20A and 20B to transmit the downlink information to each of the plurality of cells 1-1 to 2-2 immediately.

In step S1004, each of the base stations 20A and 20B transmits the received downlink information by using the downlink common channel for each cell immediately.

Subsequently, the mobile station 30 performs the soft combining process or the selective combining process on the plurality of same downlink information received in the plurality of cells 1-1 to 2-2.

<Functions and Effects of the Radio Communications System According to the First Embodiment>

According to the radio communications system of the first embodiment, it is possible for each of the base stations 20A and 20B to control the timing for transmitting the downlink information to the plurality of cells 1-1 to 2-2, in accordance with the delay time between the time when the radio network controller 10 transmits the downlink information and the time when each of the base stations 20A and 203 transmits the downlink information to each of the plurality of cells 1-1 to 2-2. Therefore, the mobile station 30 can receive and combine the downlink common channels from the plurality of cells 1-1 to 2-2.

<A Second Embodiment of the Present Invention>

Referring to FIGS. 7 to 10, a radio communications system according to a second embodiment of the present invention will be described. Hereinafter, the difference between the radio communications system according to the first embodiment and the radio communications system according to the second embodiment will be explained mainly.

The delay time measuring unit 11 of the radio network controller 10 is configured to measure each delay time difference which is a difference between each of measured delay times and each of maximum permissible delay times in the plurality of cells.

The delay time storing unit 12 is configured to store the delay time and the delay time difference per cell. For example, as shown in FIG. 7, the delay time storing unit 12 is configured to store a "base station", a "cell", a "delay time" and a "delay time difference".

In an example of FIG. 7, the maximum permissible delay time in each cell is "X4", the delay time between the time when the radio network controller 10 transmits the downlink information and the time when the base station 20A transmits the downlink information to the cell 1-1 is "X1", the delay time difference in the cell 1-1 is "Y1(X4−X1)".

The delay time between the time when the radio network controller 10 transmits the downlink information and the time when the base station 20A transmits the downlink information to the cell 1-2 is "X2", the delay time difference in the cell 1-2 is "Y2(X4−X2)".

The delay time between the time when the radio network controller 10 transmits the downlink information and the time when the base station 20B transmits the downlink information to the cell 2-1 is "X3", the delay time difference in the cell 2-1 is "Y3(X4−X3)".

The delay time between the time when the radio network controller 10 transmits the downlink information and the time when the base station 20B transmits the downlink information to the cell 2-2 is "X4", the delay time difference in the cell 2-2 is "Y4(X4−X4=0)".

The transmission timing controlling unit 13 is configured to instruct the base stations 20A and 20B to delay transmission of the downlink information to each of the plurality of cells 1-1 to 2-2 by each of the delay time differences, by transmitting transmission timing information including the above mentioned delay time differences.

Figure 8:
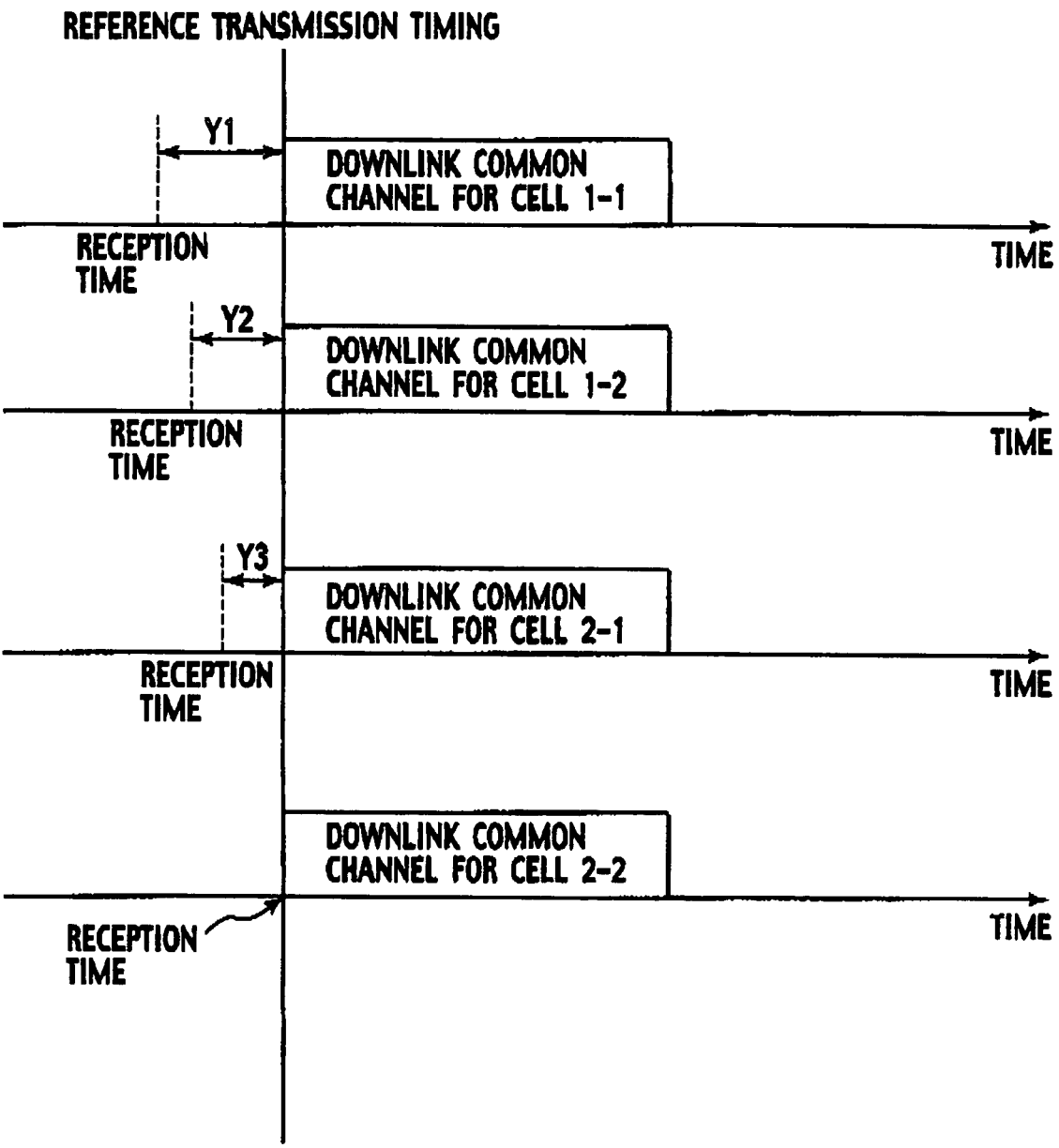
FIG. 8 is a diagram for explaining a method for transmitting a downlink common channel to a plurality of cells in a radio communications system according to the second embodiment of the present invention.

To be more specific, as shown in FIG. 8, the transmission timing controlling unit 13 instructs the base station 20A to delay transmission of the downlink common channel for the cell 1-1 including the downlink information to the cell 1-1 by the delay time difference Y1.

The transmission timing controlling unit 13 instructs the base station 20A to delay transmission of the downlink common channel for the cell 1-2 including the downlink information to the cell 1-2 by the delay time difference Y2.

The transmission timing controlling unit 13 instructs the base station 20B to delay transmission of the downlink common channel for the cell 2-1 including the downlink information to the cell 2-1 by the delay time difference Y3.

The transmission timing controlling unit 13 instructs the base station 20B to delay transmission of the downlink common channel for the cell 2-2 including the downlink information to the cell 2-2 by the delay time difference Y4. In other words, transmission timing controlling unit 13 instructs the base station 20B to transmit the downlink common channel for the cell 2-2 to the cell 2-2 immediately.

The transmission timing controlling unit 13 can be configured to transmit the transmission timing information including the delay time per cell and the maximum permissible delay times in the plurality of cells, instead of the above mentioned transmission timing information including the delay time difference.

Figure 9:
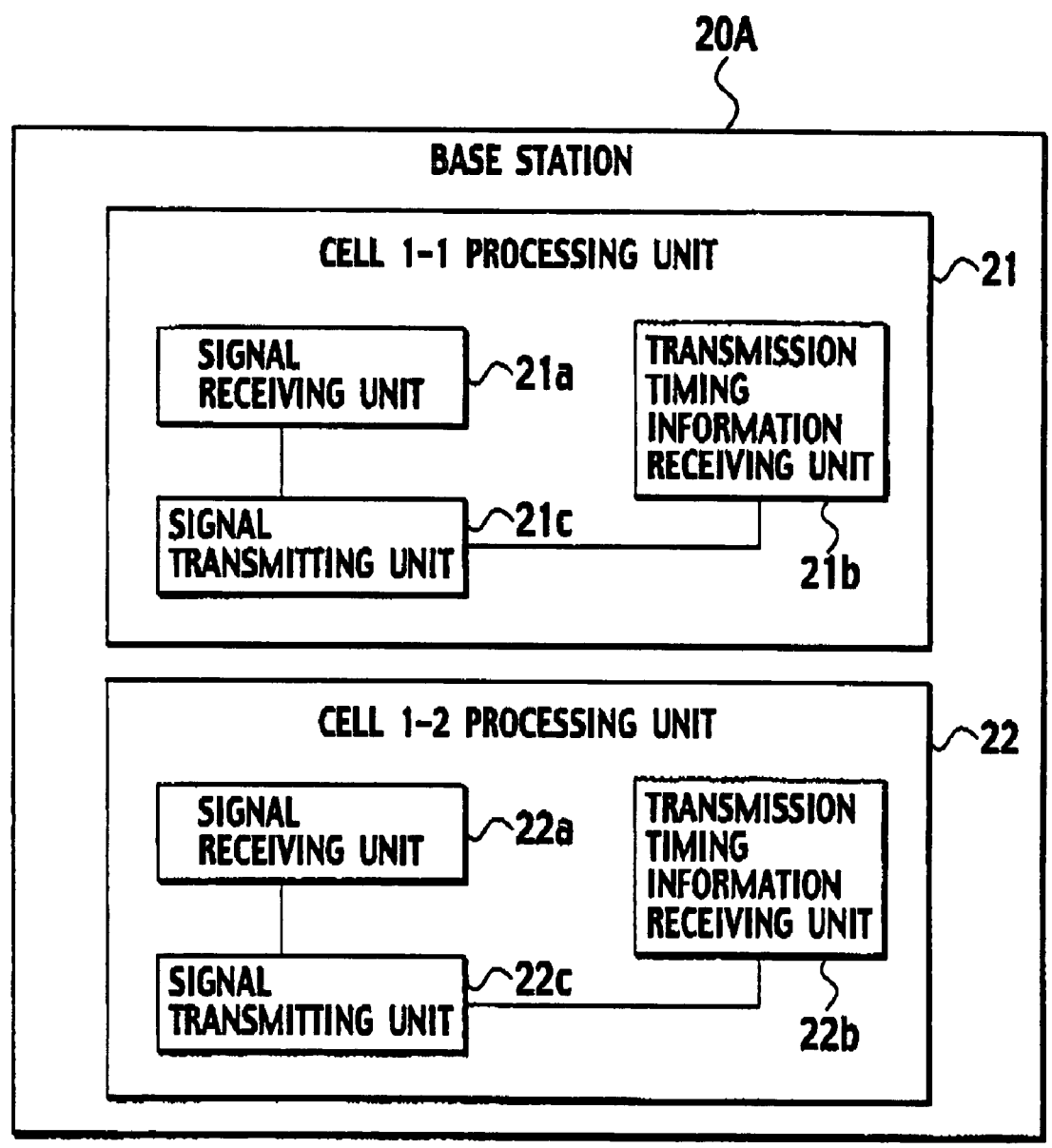
FIG. 9 is a functional block diagram of a base station according to the second embodiment of the present invention.

As shown in FIG. 9, the base station 20A includes cell processing units corresponding to cells which are managed by the base station 20A.

In FIG. 9, a cell 1-1 processing unit 21 and a cell 1-2 processing unit 22 are described as a representative of the cell processing units.

In the embodiment, since the configuration of the base station 20A is same as the configuration of the base station 20B essentially, hereinafter, the configuration of the base station 20A will be described.

Moreover, in the embodiment, since the configuration of the cell 1-1 processing unit 21 is same as the configuration of the cell 1-2 processing unit 22 essentially, hereinafter, the configuration of the cell 1-1 processing unit 21 will be described.

As shown in FIG. 9, the cell 1-1 processing unit 21 includes a signal receiving unit 21a, a transmission timing information receiving unit 21b and a signal transmitting unit 21c.

The signal receiving unit 21a is configured to receive same downlink information which is to be transmitted to the cell 1-1 by using the downlink common channel, from the radio network controller 10.

The transmission timing information receiving unit 21b is configured to receive transmission timing information including a delay time difference of the cell 1-1, from the radio network controller 10.

The transmission timing information receiving unit 21b can be configured to receive the transmission timing information including the delay time between the time when the radio network controller 10 transmits the downlink information and the time when the base station 20A transmits the downlink information to the cell 1-1 and the maximum permissible delay times in the plurality of cells 1-1 to 2-2, so as to calculate the delay time difference in accordance with the received transmission timing information.

The signal transmitting unit 21c is configured to delay transmission of the downlink information, which is transmitted from the radio network controller 10, to the cell 1-1 using the downlink common channel by the delay time difference.

The signal transmitting unit 21c can be configured to transmit the downlink information, which is transmitted from the radio network controller 10, to the cell 1-1, in accordance with an instruction regarding to the cell by the radio network controller 10.

Figure 10:
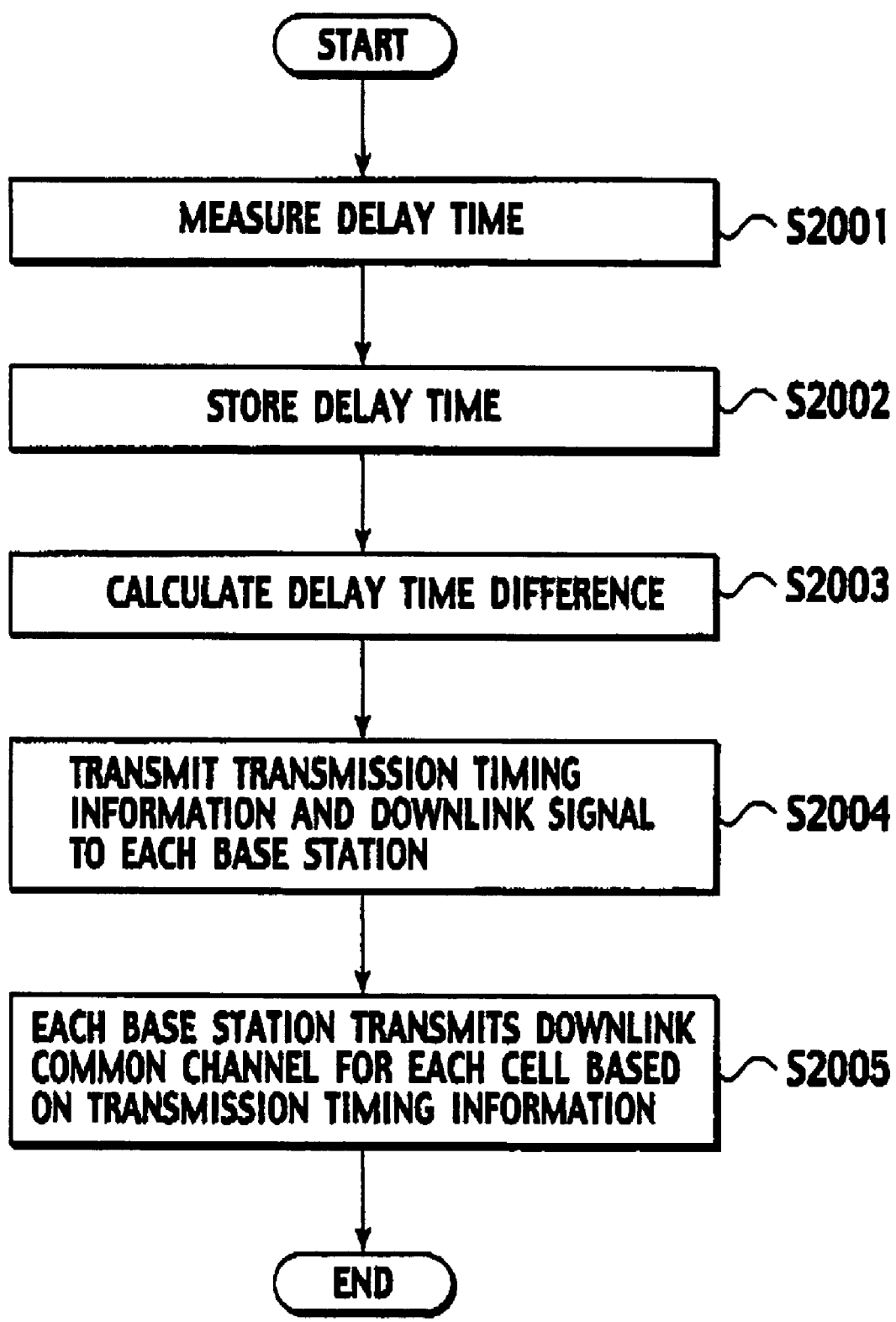
FIG. 10 is a flowchart showing an operation of the radio communications system according to the second embodiment of the present invention.

Referring to FIG. 10, an operation of the radio communications system according to the second embodiment will be described.

As shown in FIG. 10, in step S2001, the delay time measuring unit 11 of the radio network controller 10 measures each delay time between the time when the radio network controller 10 transmits the downlink information and the time when each of the base stations 20A and 20B transmits the downlink information to each of the plurality of cells 1-1 to 2-2.

In step S2002, the delay time storing unit 12 of the radio network controller 10 stores the delay times measured by the delay time measuring unit 11 of the radio network controller 10.

In step S2003, the delay time measuring unit 11 of the radio network controller 10 calculates each delay time difference which is a difference between each of measured delay times and each of maximum permissible delay times in the plurality of cells.

In step S2004, the transmission timing controlling unit 13 of the radio network controller 10 instructs the base stations 20A and 20B to delay transmission of the downlink information to each of the plurality of cells 1-1 to 2-2 by each of the delay time differences, by transmitting transmission timing information including the above mentioned delay time differences.

In step S2005, each of the base stations 20A and 20B delays transmission of the received downlink information by using the downlink common channel for each cell by each of the delay time differences.

Subsequently, the mobile station 30 performs the soft combining process or the selective combining process on the plurality of same downlink information received in the plurality of cells 1-1 to 2-2.

According to the radio communications system of the second embodiment, it is possible for each of the base stations 20A and 20B to control the timing for transmitting the downlink information to the plurality of cells 1-1 to 2-2, in accordance with the delay time difference which is included in the transmission timing information transmitted from the radio network controller 10. Therefore, the mobile station 30 can receive and combine the downlink common channels from the plurality of cells 1-1 to 2-2.

<Modification >1

In a radio communications system according to a modification 1 of the present invention, the delay time measuring unit 11 of the radio network controller 10 is configured to measure the above mentioned delay times, in accordance with the sum of each "cell unique timing offset" and each "cell common channel timing offset".

Here, the cell unique timing offset is a difference between transmission timing of a base station common frame which is common in the base station 20A (or 20B) and transmission timing of a cell unique frame which is unique to each of the plurality of cells 1-1 to 2-2.

The cell common channel timing offset is a difference between the transmission timing of the cell unique frame and transmission timing of a cell common channel frame which is unique in the plurality of cells 1-1 to 2-2.

Figure 11:
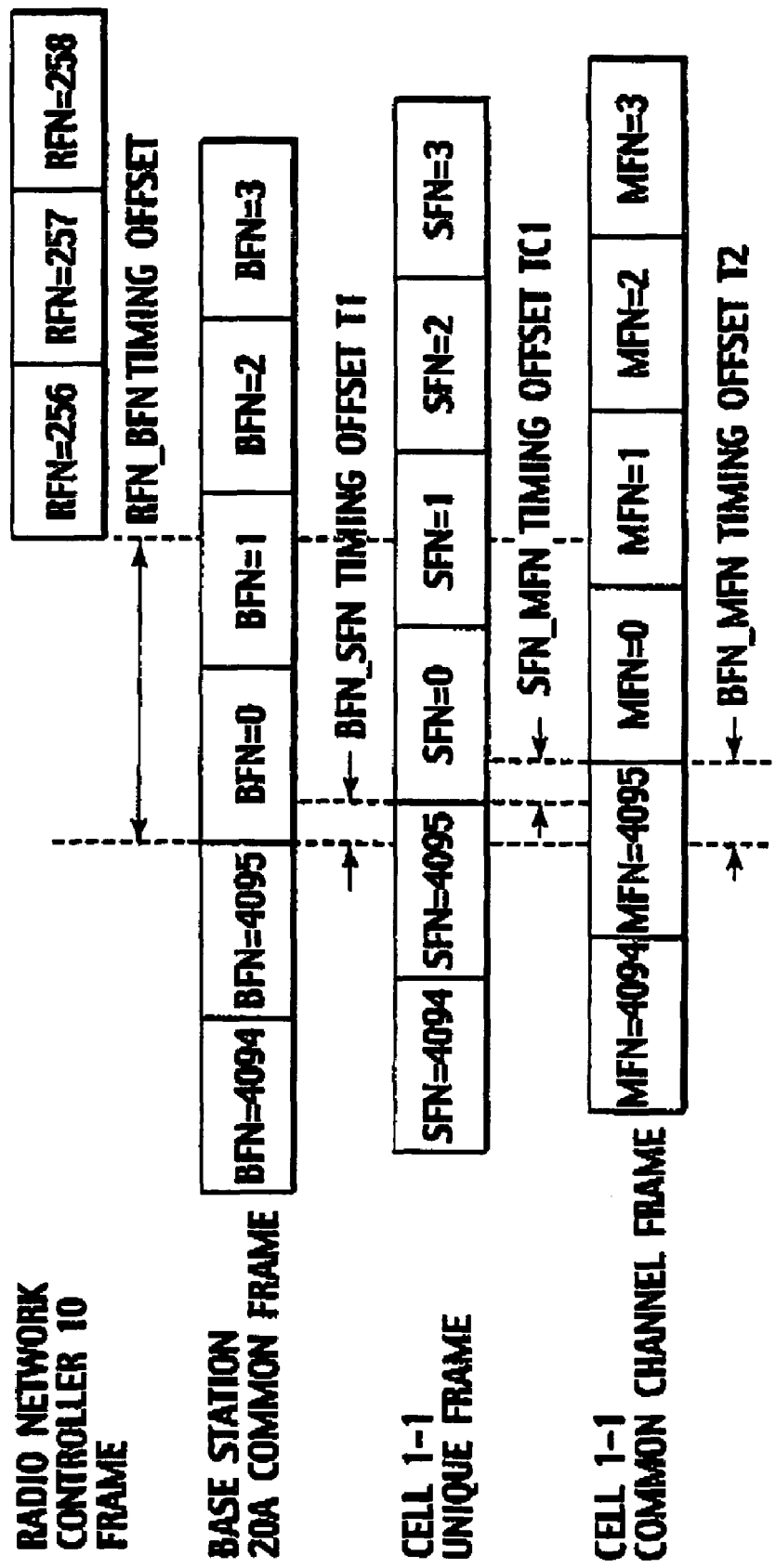
FIG. 11 is a diagram for explaining a method for measuring a delay time by a delay time measuring unit of a radio network controller according to an modification 1 of the present invention.

Referring to FIG. 11, a method for measuring a delay time according to the modification 1 will be explained.

FIG. 11 shows transmission timing of a radio network controller 10 frame (RFN timing), transmission timing of a base station 20A common frame (BFN timing), transmission timing of a cell 1-1 unique frame (SFN timing) and transmission timing of a cell 1-1 common channel frame (MFN timing).

Here, the RFN is a frame number counter for the radio network controller 10 frame, the BFN is a frame number counter for the base station 20A common frame, the SFN is a frame number counter for the cell 1-1 unique frame, and the MFN is a frame number counter for the cell 1-1 common channel frame.

The base station 20A common frame is used commonly in the all cells 1-1 to 1-2 which are managed by the base station 20A. The cell 1-1 unique frame is transmitted in the broadcast channels of the cell 1-1, and common control channels such as pilot channels, synchronization channels and so on are transmitted at the same timing. The cell 1-1 common channel frame is applied for the common channels (multicast data) in the cell 1-1.

In the modification 1, when node synchronization is established between the radio network controller 10 and the base station 20A, an "RFN_BFN timing offset" which is a difference between the transmission timing of the radio network controller 10 frame (the RFN timing) and the transmission timing of the base station 20A common frame (the BFN timing) is configured to be acquired.

A "BFN_SFN timing offset (the cell unique timing offset) T1" which is a difference between the transmission timing of the base station 20A common frame (the BFN timing) and the transmission timing of the cell 1-1 unique frame (the SFN timing) is managed by the base station 20A. The "BFN_SFN timing offset T1" can be configured to be instructed by the radio network controller 10.

An "SFN_MFN timing offset (the cell common channel timing offset) TC1" which is a difference between the transmission timing of the cell 1-1 unique frame (the SFN timing) and the transmission timing of the cell 1-1 common channel frame (the MFN timing) can be configured to be directed by the radio network controller 10.

The delay time measuring unit 11 of the radio network controller 10 can calculate the above mentioned delay time (in an example of FIG. 11, the "RFN_BFN timing offset"-a "BFN_MFN timing offset"), by using the "BFN_MFN timing offset", which is the sum of the "BFN_SFN timing offset T1" and the "SFN_MFN timing offset TC1", and the "RFN_BFN timing offset".

As a result, for example, the transmission timing controlling unit 13 of the radio network controller 10 can control the "SFN_MFN timing offset TC1" based on the above mentioned delay time, so that the mobile station can receive and combine the downlink common channels from the plurality of cells.

<Modification >2

In a radio communications system according to a modification 2 of the present invention, the delay time measuring unit 11 of the radio network controller 10 is configured to measure the delay time in accordance with timing difference information acquired when synchronization of a common channel is established between the radio network controller 10 and each of the base stations 20A and 20B.

Figure 12:
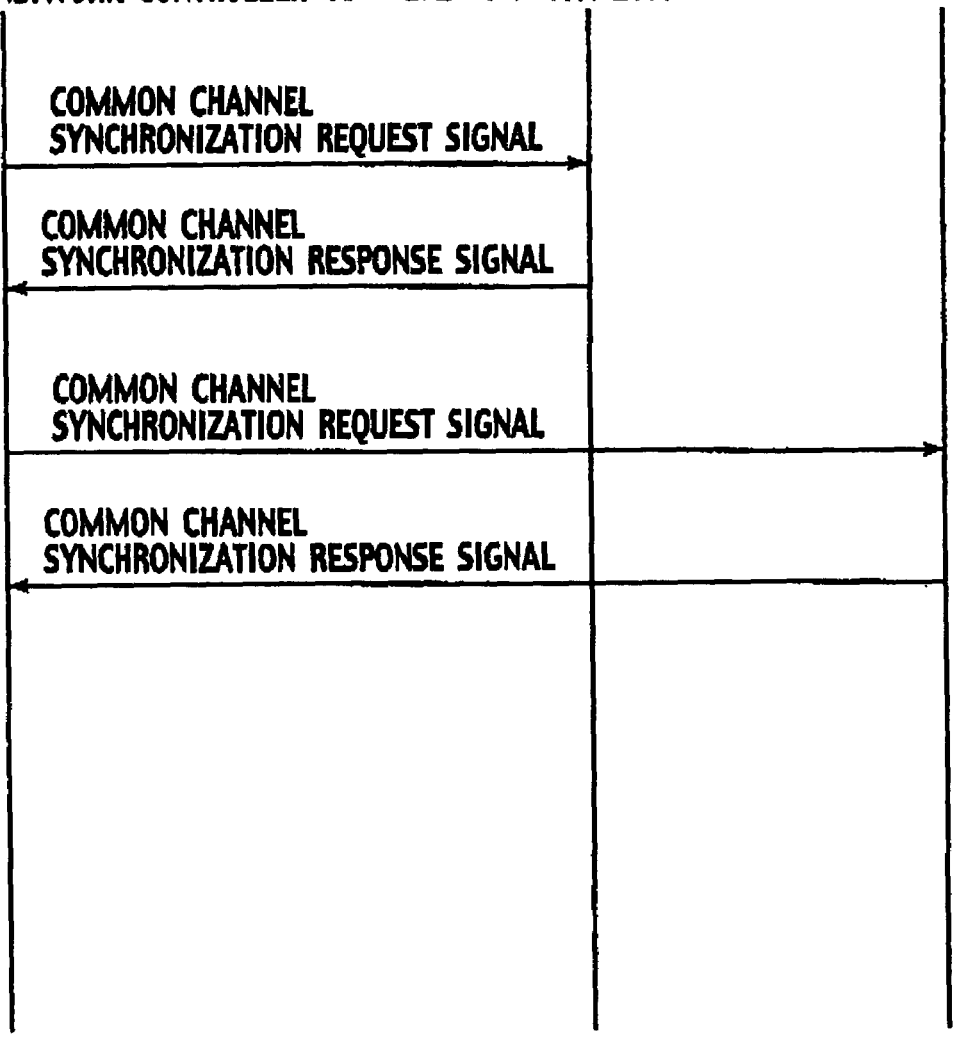
FIG. 12 is a diagram for explaining a method for measuring a delay time by a delay time measuring unit of a radio network controller according to an modification 2 of the present invention.

To be more specific, as shown in FIG. 12, when a common channel is established between the radio network controller 10 and each of the base stations 20A and 20B, the radio network controller 10 transmits a common channel synchronization request signal to each of the base stations 20A and 20B and each of the base stations 20A and 203 transmits a common channel synchronization response signal to the radio network controller 10 in response to the common channel synchronization request signal.

The delay time measuring unit 11 is configured to acquire the above mentioned timing difference information from the received common channel synchronization response signal.

For example, when synchronization of the above mentioned common channel is established, the delay time measuring unit 11 of the radio network controller 10 can acquire a difference between the transmission timing of the radio network controller 10 frame (the RFN timing) and the transmission timing of the cell common channel frame (the MFN timing) in each cell as the above mentioned timing difference information, so as to measure the above mentioned delay time.

As a result, the transmission timing controlling unit 13 of the radio network controller 10 can control the "SFN_MFN timing offset TC1" based on the above mentioned delay time, so that the mobile station can receive and combine the downlink common channels from the plurality of cells.

The present invention can provide a radio communications system which controls transmission timing of downlink common channels among a plurality of cells so that a mobile station receives and combines the downlink common channels from the plurality of cells, a radio network controller and a base station.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A radio communications system which transmits same downlink information to a plurality of cells by using downlink common channels, the radio communications system comprising a radio network controller and a base station; and wherein the radio communications system is configured to measure each delay times between a time when the radio network controller transmits the downlink information and a time when the base station transmits the downlink information to each of a plurality of cells, to calculate each delay time differences which is a difference between each of the measured delay times and a measured delay time having a maximum delay time among each of the measured delay times, and to instruct each base station to respectively delay a transmission of the downlink information to each of the plurality of cells using each of the calculated delay time differences.

2. A radio network controller used in a radio communications system in which a base station transmits same downlink information to a plurality of cells by using downlink common channels, the radio network controller comprising:

a measurer configured to measure each delay times between a time when the radio network controller transmits the downlink information and a time when the base station transmits the downlink information to each of a plurality of cells, and to calculate each delay time differences which is a difference between each of the measured delay times and a measured delay time having a maximum delay time among each of the measured delay times; and a controller configured to instruct each base station to respectively delay a transmission of the downlink information to each of the plurality of cells using each of the calculated delay time differences.

3. The radio network controller according to claim 2, wherein the measurer is configured to measure the delay time in accordance with timing difference information acquired when node synchronization is established between the radio network controller and the base station.

4. The radio network controller according to claim 3, wherein the measurer is configured to measure the delay times in accordance with the sum of each cell unique timing offset and each cell common channel timing offset, the cell unique timing offset being a difference between transmission timing of a base station common frame which is common in the base station and transmission timing of a cell unique frame which is unique to each of the plurality of cells, the cell common channel timing offset being a difference between the transmission timing of the cell unique frame and transmission timing of a cell common channel frame which is common in the plurality of cells.

5. The radio network controller according to claim 2, wherein the measurer is configured to measure the delay time in accordance with timing difference information acquired when synchronization of a common channel is established between the radio network controller and the base station.

6. A base station which transmits same downlink information to a plurality of cells by using downlink common channels, the base station comprising:

a receiver configured to acquire each delay times between a time when a radio network controller transmits the downlink information to the base station and a time when the base station transmits the downlink information to a plurality of cells; and a processor configured to calculate each delay time differences which is a difference between an acquired delay time and an acquired delay time having a maximum delay time among acquired delay times of the plurality of cells; and a controller configured to delay a transmission of the downlink information transmitted from the radio network controller to the plurality of cells using the calculated delay time differences.

7. A base station which transmits same downlink information to a plurality of cells by using downlink common channels, the base station comprising:

a transmitter configured to delay a transmission of the downlink information transmitted from a radio network controller to a plurality of cells based on an instruction form the radio network controller that instructs the base station to delay the transmission of the downlink information to the plurality of cells using each calculated delay time differences, wherein the each calculated delay time differences is a difference between a measured delay time and a measured delay time having a maximum delay time among measured delay times of the plurality of cells, the measured delay time being a time between a time when the radio network controller transmits the down link information and a time when the base station transmits the downlink information to the plurality of cells.

* * * * *